Patented June 27, 1944

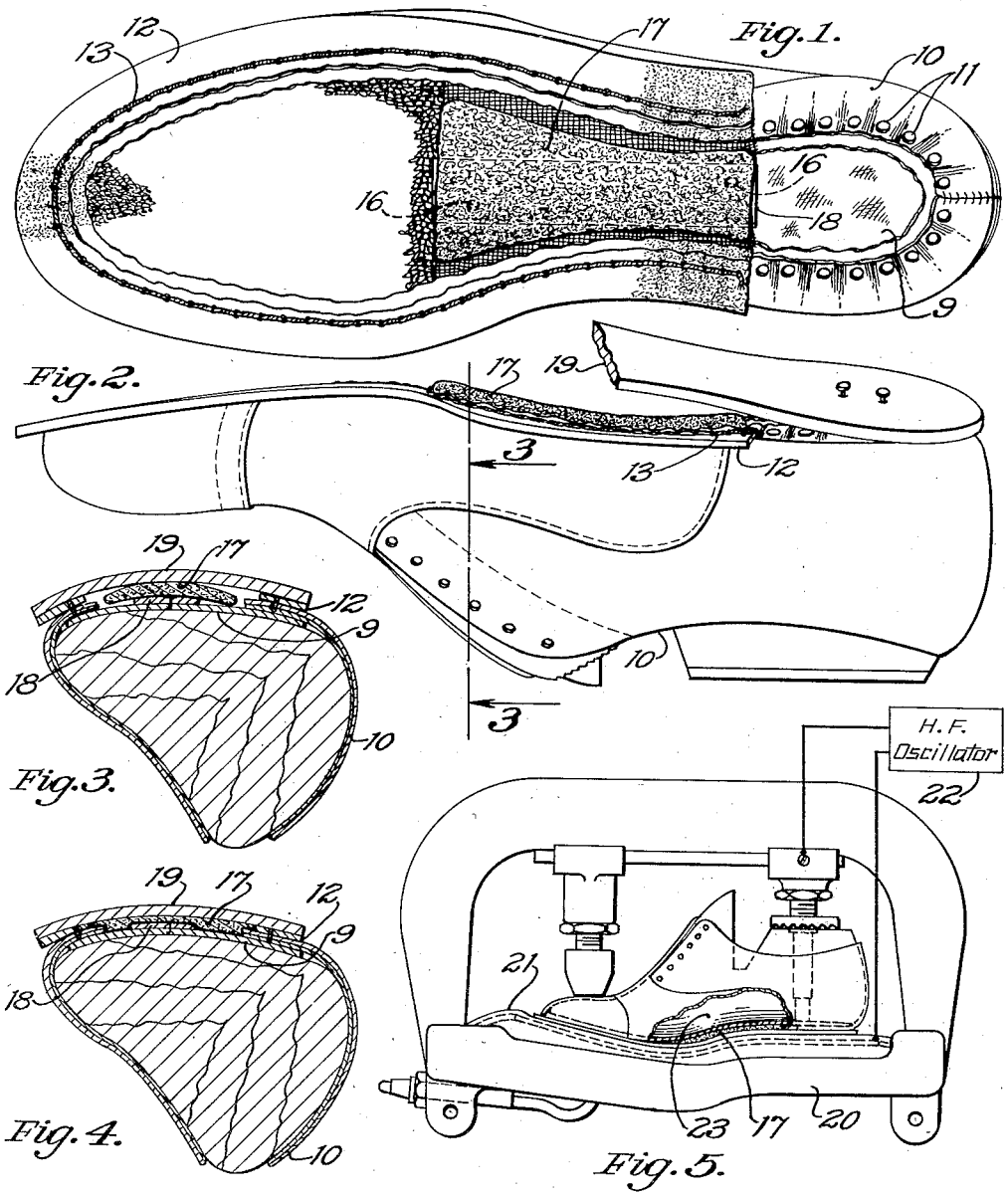

2,352,520

UNITED STATES PATENT OFFICE 2,352,520

MANUFACTURE OF FOOTWEAR

Fred Dawson, West Roxbury, Mass., assignor to Compo Shoe Machinery Corporation, Boston, Mass., a corporation of Delaware Application June 26, 1943, Serial No. 492,391

5 Claims. (Cl. 12—142)

This invention relates to shoes and their manufacture and relates more particularly to the provision of shank pieces in cemented shoes.

Shank pieces are used in the shanks of shoes for strengthening the arch portions of the bottoms of the shoes. Shank pieces of spring steel are usually used in women's shoes and wooden shank pieces are usually used in men's shoes. These prior shank pieces have had to be pre-shaped to conform exactly with the arches of the shoes. Different sizes and models of shoes require differently shaped shank pieces. Additional manufacturing cost is required for the pre-shaping of the shank pieces. The prior shank piece did not extend across the full width of the shank and there were voids between the shoe bottom and portions of the shank piece resulting in undesired movement under pressure, of the shoe arch.

This invention provides plastic shank pieces for cemented shoes which are curved and flowed under the influence of the heat and pressure applied during the cementing of the soles to the shoes, to flow into all crevices and voids for filling same and to conform to the shape of the lasts for forming smooth permanent arches.

This invention is particularly applicable to shoes cemented by electrostatic energy as disclosed in the E. C. Pitman Patent No. 2,087,480 since the plastic shank pieces may be made of materials having the same melting time as the cements used for cementing the soles or may be made of the same material as the cements.

An object of the invention is to mould a plastic shank piece in a cemented shoe in the same operation which applies heat and pressure for cementing the sole to the shoe.

Another object of the invention is to provide improved shank pieces for shoes.

Other and more definite objects of the invention are to utilize electrostatic energy provided for melting the cement for cementing soles to shoes, for melting a plastic shank piece, and to utilize the pressure provided for pressing a sole to be cemented against the shoe bottom, for moulding the melted plastic shank piece to the shape of the last.

The invention will now be described with reference to the drawing, of which:

Fig. 1 is a plan view looking at the bottom of a shoe before the sole is applied, with a plastic shank piece embodying this invention in place upon the shoe bottom prior to the sole attaching operation;

Fig. 2 is a side elevation of the shoe of Fig. 1 and illustrates additionally a portion of the outsole which is to be cemented to the shoe;

Fig. 3 is a sectional view taken along the lines 3—3 of Fig. 2;

Fig. 4 is a view similar to Fig. 3 illustrating the plastic shank piece after it has been heated and moulded; and Fig. 5 is a view of a press which may be used for attaching the sole to, and for moulding the plastic shank piece of, the shoe of Figs. 1 and 2.

The shoe illustrated has the upper 10 tacked at 11 as is usual to the heel end of the insole 9 while the forepart and shank portions of the upper may be lasted to the insole by an adhesive. The welt 12 is stitched at 13 in usual manner to the upper and the forepart of the shoe bottom is filled with the usual cork compound. While the shoe construction illustrated is of the "pre-welt" type other constructions such as "Goodyear Welt" or McKay lasted uppers with or without a welt would be suitable.

The plastic shank piece 17 is attached to the insole 9 as by tacks 16. The shank piece 17 has, as illustrated by Fig. 3, a radius of curvature substantially less than the shoe bottom and the strip 18 may be within the arc of the curved shank piece for maintaining its curvature when pressure is applied.

The sole 19 to be cemented to the shoe is then placed upon the bottom of the shoe with cement applied between the sole and bottom as disclosed in said Pitman patent and the assembled shoe placed in the press 20 as illustrated by Fig. 5.

The press 20 is of the type disclosed in the John F. Smith Patent No. 2,109,323 and has the pad 21 against the sole of the shoe, which is inflated by an operator to press the sole tightly against the shoe bottom as disclosed in said Smith patent.

The high frequency oscillator 22 is connected to a metal bottom on the last 23 serving as an electrode, and to an electrode on the pad 21 as also disclosed in said Smith patent.

Following the application of the pressure upon the shoe bottom by the inflation of the pad 21, the electric energy from the oscillator 22 is applied to the electrodes whereupon heat is generated in the cement between the sole and the shoe bottom and in the plastic shank piece 17.

The shank piece melts and flows to fill up the space between the inner edges of the welt as illustrated by Fig. 4 and forms a smooth curved surface conforming exactly to the shape of the shank portion of the last. When cooled the plastic hardens and is bonded to the shoe bottom; to the sole and to the cement used for cementing the sole. Due to the flowing of the plastic all voids and crevices between the sole and the shoe bottom are filled, with the result that the plastic when hardened is a supporter for the entire arch of the shoe.

The plastic shank piece is given the decreased radius of curvature as illustrated by Fig. 3 for the purpose of bowing the sole 19 substantially outward as illustrated. Then, when pressure is applied in the press 20 before the application of heat, the outer edges of the sole give under the pressure while the center of the sole is supported against movement by the shank piece 17 and the strip 18. This causes the shank portion of the sole to "break" so that its outer edges retain their increased curvature when the pressure is released so that they press against the welt of the shoe, and improve the appearance of the shoe.

The strip 18 preferably is of metal so that it acts as a "free" electrode between the two main electrodes for increasing the heat for melting the plastic shank piece.

The strip 18 may be omitted if the plastic selected for the shank piece is rigid enough to retain its curvature under the described pressure.

The shank piece 17 may be any suitable thermoplastic or thermosetting material such, for example, as vinylite, methyl methacrylate or one of the polyvinal acetates.

While one embodiment of the invention has been described for the purpose of illustration, it should be understood that the invention is not limited to the exact apparatus and arrangement of apparatus illustrated as modifications thereof may be suggested by those skilled in the art without departure from the essence of the invention.

Having thus described my invention, what I claim as new and desire to secure by Letters Patent is:

1. The method in shoe manufacture which comprises placing a plastic shank piece upon the shank portion of the bottom of a shoe, placing a sole upon said bottom with cement therebetween, pressing said sole against said bottom and said shank piece, and subjecting the assembly to the influence of an electrostatic field for melting said shank piece and said cement.

2. The method in shoe manufacturing which comprises placing a metallic strip upon the shank portion of the bottom of a shoe, placing a plastic shank piece upon said strip, placing a sole upon said bottom with cement therebetween, pressing said sole against said bottom and said shank piece, and subjecting the assembly to the influence of an electrostatic field in which said strip acts as an electrode, for melting said shank piece and said cement.

3. The method in shoe manufacture which comprises placing a curved plastic shank piece upon the curved shank portion of the bottom of a shoe, said shank piece having a radius of curvature less than that of said shank portion, placing a sole upon said bottom with cement therebetween, pressing said sole against said bottom and said shank piece, and subjecting the assembly to the influence of an electrostatic field for melting said shank piece and said cement.

4. The method in shoe manufacturing which comprises placing a metallic strip upon the curved shank portion of the bottom of a shoe, said shank piece having a radius of curvature less than that of said shank portion, placing a curved plastic shank piece upon said strip with said strip included within the arc of said shank piece, placing a sole upon said bottom with cement therebetween, pressing said sole against said bottom and said shank piece, and subjecting the assembly to the influence of an electrostatic field in which said strip acts as an electrode, for melting said shank piece and said cement.

5. The method in shoe manufacturing which comprises placing a strip upon the curved shank portion of the bottom of a shoe, said shank piece having a radius of curvature less than that of said shank portion, placing a curved plastic shank piece upon said strip with said strip included within the arc of said shank piece, placing a sole upon said bottom with cement therebetween, pressing said sole against said bottom and said shank piece, and subjecting the assembly to the influence of an electrostatic field, for melting said shank piece and said cement.

FRED DAWSON.